United States Patent [19]

Shibayama

[11] Patent Number: 5,050,717
[45] Date of Patent: Sep. 24, 1991

[54] TEMPERATURE RESPONSIVE LOCK-UP CONTROL FOR MOTOR VEHICLE WITH AUTOMATIC TRANSMISSION

[75] Inventor: Takashi Shibayama, Isehara, Japan

[73] Assignee: Nissan Motor Co., Ltd., Yokohama, Japan

[21] Appl. No.: 500,956

[22] Filed: Mar. 29, 1990

[30] Foreign Application Priority Data

Mar. 31, 1989 [JP] Japan .................................. 1-82430

[51] Int. Cl.⁵ ...................... F16H 45/02; B60K 41/28
[52] U.S. Cl. .............................. 192/0.052; 192/0.076; 192/3.31; 192/82 T
[58] Field of Search ................ 192/3.29, 3.3, 0.052, 192/82 T, 0.076, 3.31; 475/65

[56] References Cited

U.S. PATENT DOCUMENTS

| | | | |
|---|---|---|---|
| 4,449,618 | 5/1984 | Suga et al. | 475/65 X |
| 4,680,992 | 7/1987 | Hayasaki et al. | 74/869 |
| 4,687,083 | 8/1987 | Sotoyama et al. | 192/3.3 X |
| 4,730,521 | 3/1988 | Hayasaki et al. | 74/867 |
| 4,817,473 | 4/1989 | Baltusis et al. | 192/3.3 X |
| 4,825,366 | 4/1989 | Yamamoto et al. | 192/3.31 X |

FOREIGN PATENT DOCUMENTS

| | | | |
|---|---|---|---|
| 0130660 | 6/1986 | Japan | 192/3.3 |
| 0248959 | 11/1986 | Japan | 192/3.3 |
| 62-137467 | 6/1987 | Japan | 192/3.3 |

Primary Examiner—Rodney H. Bonck
Attorney, Agent, or Firm—Foley & Lardner

[57] ABSTRACT

A lock-up control in a motor vehicle includes a lock-up control solenoid for engaging a lock-up clutch in a torque converter. A hydraulic fluid temperature of hydraulic fluid used in the torque converter and also in the associated automatic transmission is detected. When the fluid temperature becomes higher than a predetermined temperature value, for example 120° C. in the embodiment, a different lock-up shift point mapping is set which defines a lock-up range stretching beyond a predetermined gear position to include a gear position lower than the predetermined gear position. Thus, the lock-up range where the lock-up clutch should be engaged stretches, rendering the torque converter to stop stirring the hydraulic fluid therein when the fluid temperature is higher than the predetermined temperature value, effectively preventing further rise in the fluid temperature.

6 Claims, 7 Drawing Sheets

AT NORMAL TEMP.

TEMPERATURE RESPONSIVE LOCK-UP CONTROL FOR MOTOR VEHICLE WITH AUTOMATIC TRANSMISSION

BACKGROUND OF THE INVENTION

The present invention relates to a lock-up control for a motor vehicle with an automatic transmission, and more particularly to a system for controlling a lock-up clutch in a torque converter fluidly disposed between an engine and an automatic transmission.

A motor vehicle is known which employs a torque converter as being disposed between an engine and an automatic transmission. The torque converter contains a hydraulic fluid as its working medium and is equipped with a lock-up clutch. This hydraulic fluid is used also in the automatic transmission. The lock-up clutch is disengaged when the vehicle operates with an accelerator pedal depressed, causing the torque converter to induce torque multiplication. When the vehicle travels at high speeds, the lock-up clutch is engaged for increased transmission efficiency of torque.

U.S. Pat. No. JP-A-62-137467 discloses a system for controlling a lock-up clutch in response to temperature of the hydraulic fluid used in the automatic transmission. When the fluid temperature is low, it is desired that the lock-up clutch is released, allowing the torque converter to effect torque multiplication. However, if, under this low temperature condition, the lock-up clutch remains released over the whole range of running modes of the vehicle, the fuel economy becomes very poor. Thus, according to this known system, a table look-up operation of a single lock-up shift point mapping is performed based on a throttle opening degree and a corrected vehicle speed. The corrected vehicle speed results from multiplying an actual vehicle speed with a correction coefficient that is variable with varying fluid temperature. Specifically, the correction coefficient assumes 1.0 when the fluid temperature is higher than a predetermined temperature value (for example 40° C.), but it drops to 0.5 when the temperature is not higher than the predetermined value. Thus, under the low temperature condition, the torque converter locks up when the vehicle speed increases further beyond a normal vehicle speed value at which the torque converter normally locks up at normal temperatures higher than the predetermined temperature value. It is also suggested in U.S. Pat. No. JP-A-62-137467 to use a different lock-up shift point mapping when the temperature is not higher than 40° C.

This known system fails to deal with the situation where the fluid temperature becomes excessively high since the single lock-up shift point mapping is kept used when the fluid temperature becomes higher than the predetermined temperature value of 40° C.

With this known system, there is the possibility that the fluid temperature becomes excessively high during a long uphill climbing. During the uphill climbing, the vehicle operates with an accelerator pedal depressed at a third or a second gear position, so that the torque multiplication of the torque converter continues. If the component parts of the automatic transmission are exposed to this high fluid temperature for a long period of time, the frictional elements of clutches and brakes suffer from baking and thus deteriorated.

An object of the present invention is to improve a lock-up control such that when the temperature of the hydraulic fluid is about to become abnormally high, the lock-up clutch is engaged to prevent a further increase in the temperature of the hydraulic fluid.

SUMMARY OF THE INVENTION

According to the present invention, there is provided a lock-up control comprising, means for detecting a fluid temperature of hydraulic fluid which is used in a torque converter and an automatic transmission and generating a fluid temperature indicative signal indicative of said fluid temperature detected, means for detecting predetermined operating variables of a motor vehicle and signals indicative of said predetermined operating variables detected, means for generating a lock-up signal when said signals indicative of said predetermined operating variables indicate that the motor vehicle operates in a lock-up range at a predetermined gear position, means for engaging a lock-up clutch in response to presence of said lock-up signal, and means responsive to said fluid temperature indicative signal for stretching said lock-up range over at least another one of a plurality of gear positions other than the predetermined gear position when said fluid temperature indicative signal is greater than a predetermined temperature value.

According to a specific aspect of the present invention, a lock-up control comprising; means for detecting a fluid temperature of hydraulic fluid which is used in the torque converter and the automatic transmission and generating a fluid temperature indicative signal indicative of said fluid temperature detected, means for detecting a throttle opening degree of the throttle and generating a throttle opening degree indicative signal indicative of said throttle opening degree detected, means for detecting a vehicle speed of the motor vehicle and generating a vehicle speed indicative signal indicative of said vehicle speed detected, means for generating a lock-up signal when said throttle opening degree indicative signal and said vehicle speed indicative signal indicate that the motor vehicle operates in a lock-up range at the predetermined gear position, means for engaging the lock-up clutch in response to presence of said lock-up signal, and means responsive to said fluid temperature indicative signal for stretching said lock-up range over at least another one of the plurality of gear positions other than the predetermined gear position when said fluid temperature indicative signal is greater than a predetermined temperature value.

According to a further specific aspect of the present invention, a lock-up control comprising; means for detecting a fluid temperature of hydraulic fluid which is used in the torque converter and the automatic transmission and generating a fluid temperature indicative signal indicative of said fluid temperature detected, means for detecting a throttle opening degree of the throttle and generating a throttle opening degree indicative signal indicative of said throttle opening degree detected, means for detecting a vehicle speed of the motor vehicle and generating a vehicle speed indicative signal indicative of said vehicle speed detected, means for storing a first predetermined lock-up shift point mapping that defines a lock-up range for the predetermined gear position as a function of said throttle opening degree and said vehicle speed, means for storing a second predetermined lock-up shift point mapping that defines a lock-up range for each of the predetermined gear position and at least another one of the plurality of gear positions as a function of said throttle opening degree and said vehicle speed, means responsive to said fluid temperature indicative signal for setting said first predetermined lock-up shift point mapping when said fluid temperature indicative signal fails to be greater than a predetermined temperature value and said second lock-up shift point mapping when said fluid temperature indicative signal is greater than said predetermined temperature value, and means for engaging the lock-up clutch in accordance with that one of said first and second lock-up shift point mappings which has been set.

According to another aspect of the present invention, there is provided a method of a lock-up control comprising the steps of; detecting a fluid temperature of hydraulic fluid which is used in the torque converter and the automatic transmission and generating a fluid temperature indicative signal indicative of said fluid temperature detected, detecting predetermined operating variables of the motor vehicle and signals indicative of said predetermined operating variables detected, generating a lock-up signal when said signals indicative of said predetermined operating variables indicate that the motor vehicle operates in a lock-up range at the predetermined gear position, engaging the lock-up clutch in response to presence of said lock-up signal, and stretching, responsive to said fluid temperature indicative signal, said lock-up range over at least another one of the plurality of gear positions other than the predetermined gear position when said fluid temperature indicative signal is greater than a predetermined temperature value.

According to still another aspect of the present invention, a method of a lock-up control comprising the steps of, detecting a fluid temperature of hydraulic fluid which is used in the torque converter and the automatic transmission and generating a fluid temperature indicative signal indicative of said fluid temperature detected, detecting a throttle opening degree of the throttle and generating a throttle opening degree indicative signal indicative of said throttle opening degree detected, detecting a vehicle speed of the motor vehicle and generating a vehicle speed indicative signal indicative of said vehicle speed detected, storing a first predetermined lock-up shift point mapping that defines a lock-up range for the predetermined gear position as a function of said throttle opening degree and said vehicle speed, storing a second predetermined lock-up shift point mapping that defines a lock-up range for each of the predetermined gear position and at least another one of the plurality of gear positions as a function of said throttle opening degree and said vehicle speed, setting, responsive to said fluid temperature indicative signal, said first predetermined lock-up shift point mapping when said fluid temperature indicative signal fails to be greater than a predetermined temperature value and said second lock-up shift point mapping when said fluid temperature indicative signal is greater than said predetermined temperature value, and engaging the lock-up clutch in accordance with that one of said first and second lock-up shift point mappings which has been set.

DETAILED DESCRIPTION OF THE INVENTION

Figure 1:
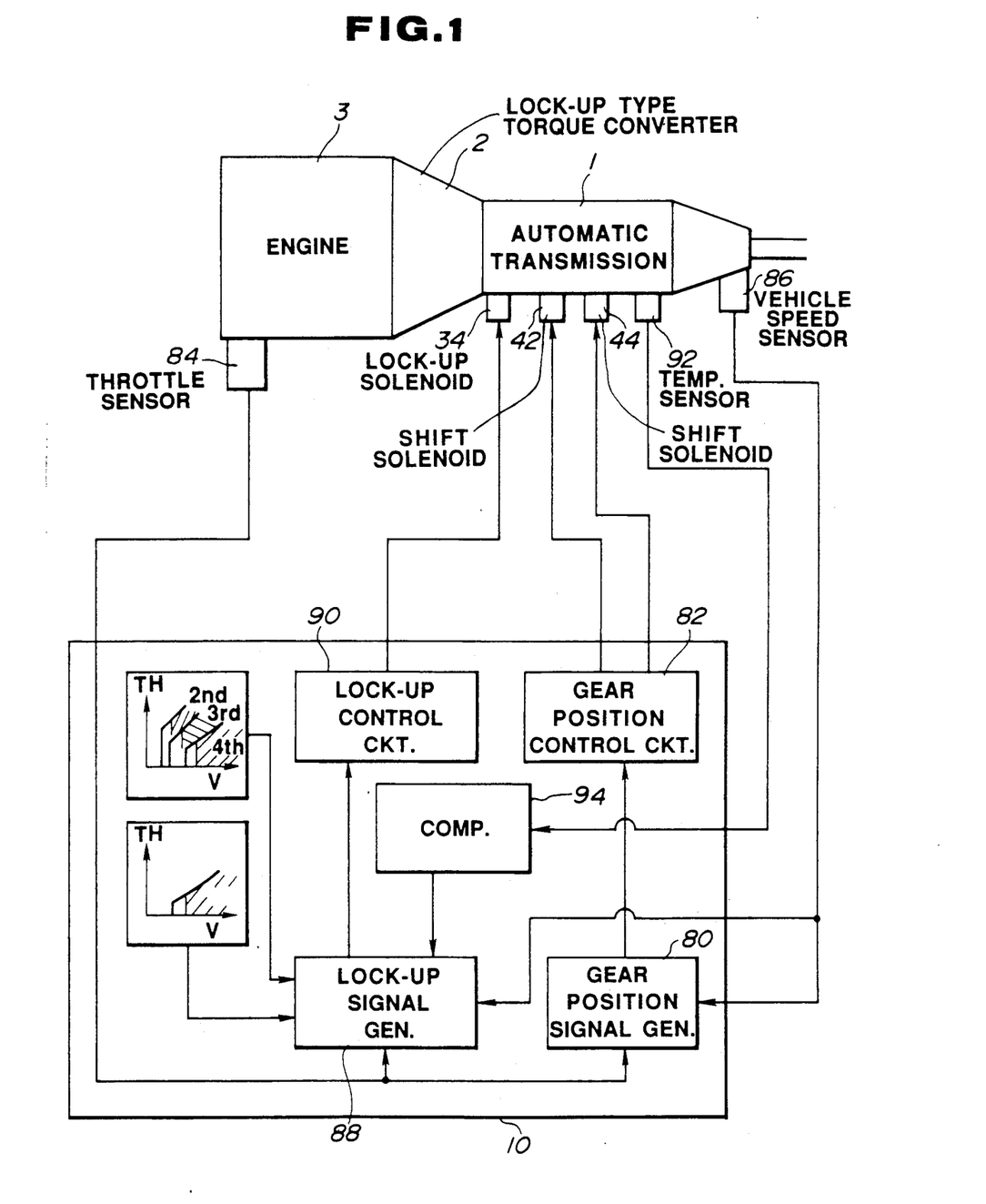
FIG. 1 is a block diagram of a motor vehicle with a lock-up control according to the present invention.

Referring to FIG. 1, a motor vehicle has an automatic transmission 1 drivingly connected via a lock-up type torque converter 2 to an internal combustion engine 3, and a control unit 10. The automatic transmission 1 is controlled by a hydraulic control system shown in FIGS. 3A and 3B. Also shown are a throttle sensor 84 which detects a throttle opening degree of a throttle of the engine and generates a throttle opening degree indicative signal indicative of the throttle opening degree detected, a vehicle speed sensor 86 which detects a vehicle speed, i.e., a revolution speed of the transmission output shaft, and generates a vehicle speed indicative signal indicative of the revolution speed of the transmission output shaft detected, and a fluid temperature sensor 92 which detects a fluid temperature of hydraulic fluid used not only in the torque converter 2 but also in the automatic transmission 1 and generates a temperature indicative signal indicative of the fluid temperature detected. The sensor output signals are supplied to the control unit 10. The control unit 10 controls a lock-up solenoid 34 for lock-up control, and two shift solenoids 42 and 44 for gear position control.

Figure 2:
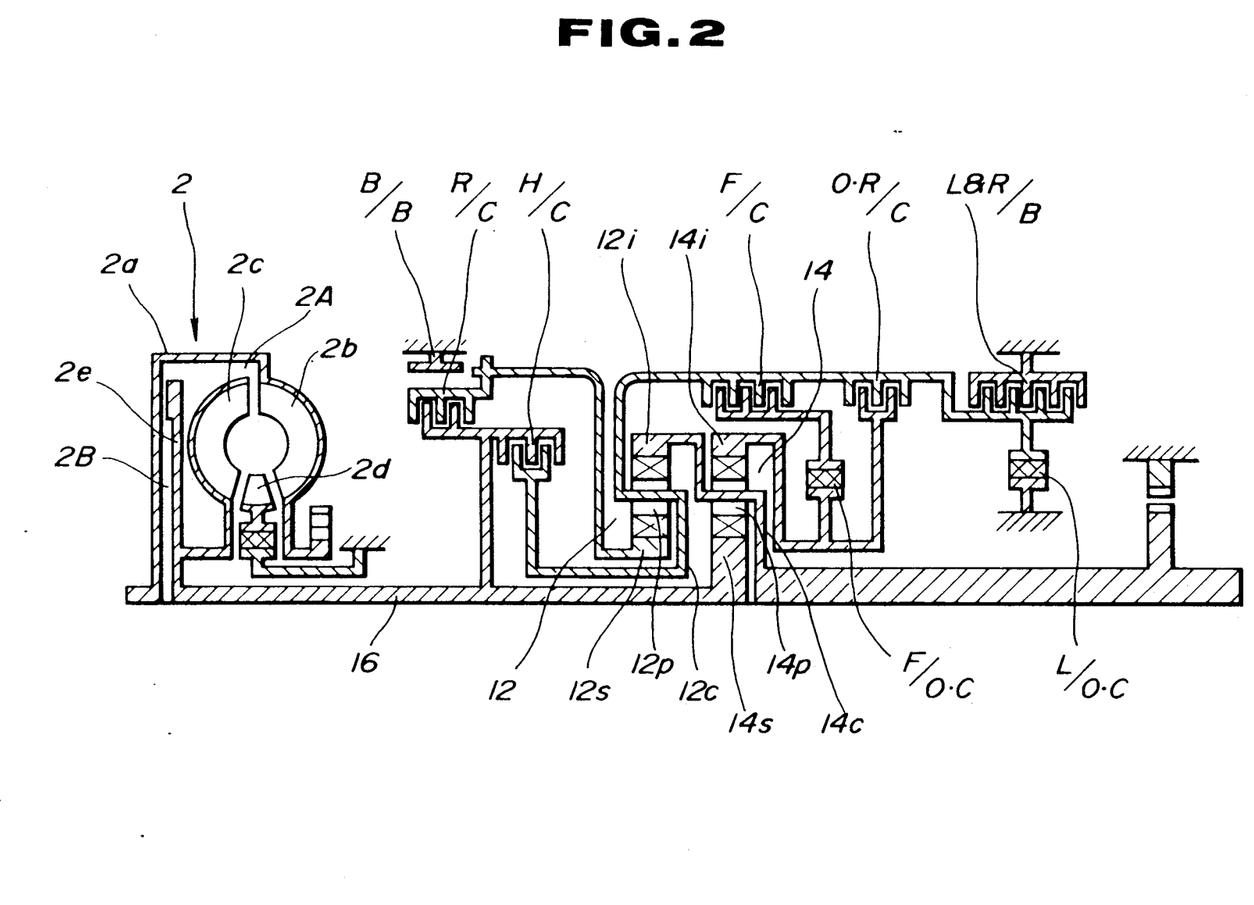
FIG. 2 is a schematic view of a power train of the motor vehicle shown in FIG. 1.

Referring to FIG. 2, the power train comprises a front planetary gear set 12 and a rear planetary gear set 14 arranged in tandem. The front planetary gear set 12 includes a front sun gear 12s, at least one front pinion 12p, a front ring gear 12i, and a front pinion carrier 12c rotatably supporting the front pinion 12p. The front pinion 12p is in mesh with the front sun gear 12s and the front ring gear 12i. The rear planetary gear set 14 includes a rear sun gear 14s, at least one rear pinion 14p, a rear ring gear 14i, and a rear pinion carrier 14c rotatably supporting the rear pinion 14p. The rear pinion 14p is in mesh with the rear sun gear 14s and the rear ring gear 14i.

The power train also comprises various kinds of fluid operated frictional devices. The frictional devices include a reverse clutch R/C which when engaged connects a transmission input shaft 16 to the front sun gear 12s, a high clutch H/C which when engaged connects the input shaft 16 to the front carrier 12c, a forward clutch F/C which when engaged connects the front pinion carrier 12c to the rear ring gear 14i, a brake band B/B which when engaged holds the front sun gear 12s stationary relative to the transmission housing, and a low and reverse brake L&R/B which when engaged holds the front pinion carrier 12c stationary relative to the transmission housing.

Operatively disposed between the forward clutch F/C and the rear ring gear 14i is a forward one-way clutch F/0 C. Operatively disposed between the front pinion carrier 12c and the transmission housing is a low one-way clutch L/0 C. Operatively disposed between the front pinion carrier 12c and the rear ring gear 14i is an overrunning clutch 0 R/C arranged in parallel with the forward one-way clutch F/0 C.

Figure 3A:
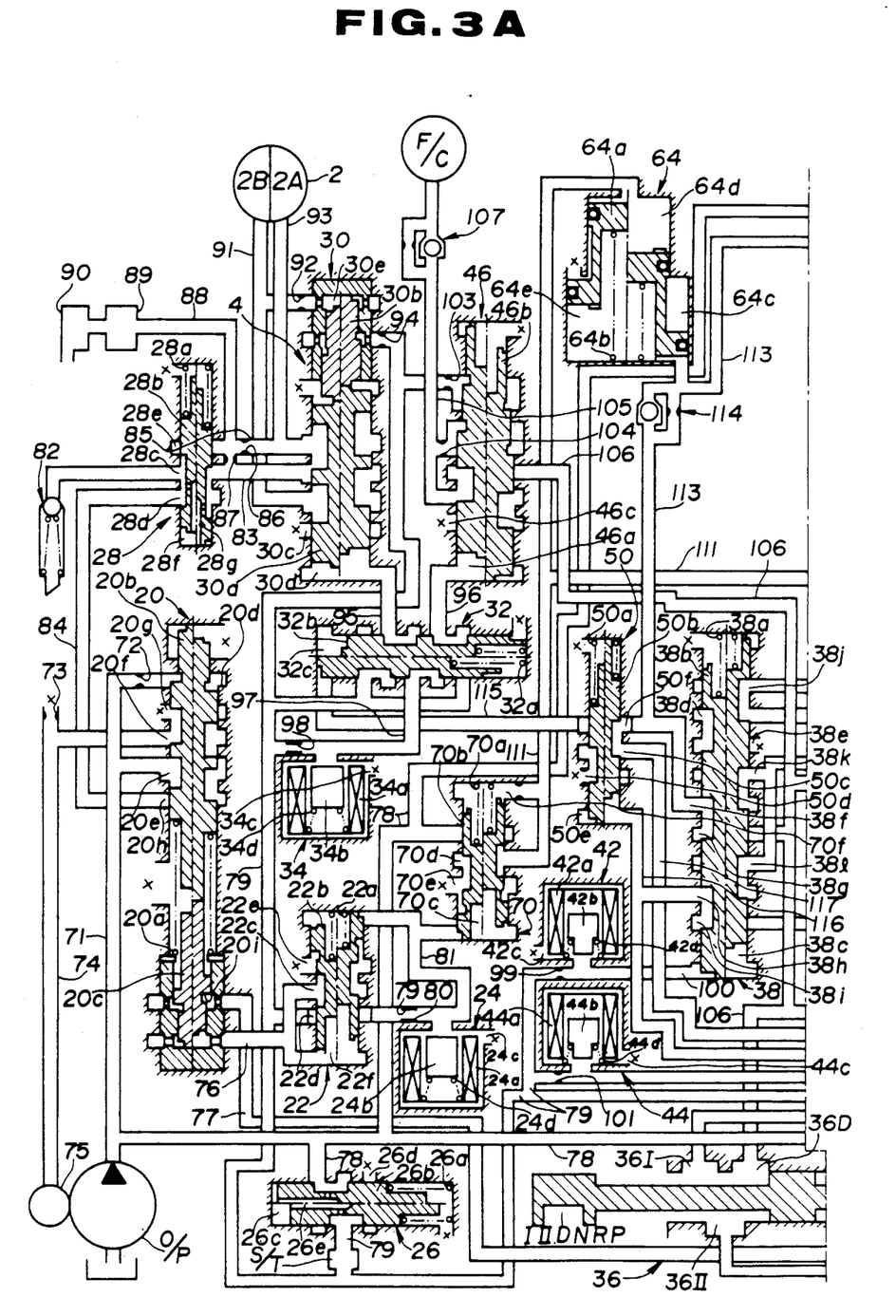
FIGS. 3A and 3B, when combined side by side, illustrate a hydraulic control system for the power train shown in FIG. 2.
Figure 3B:
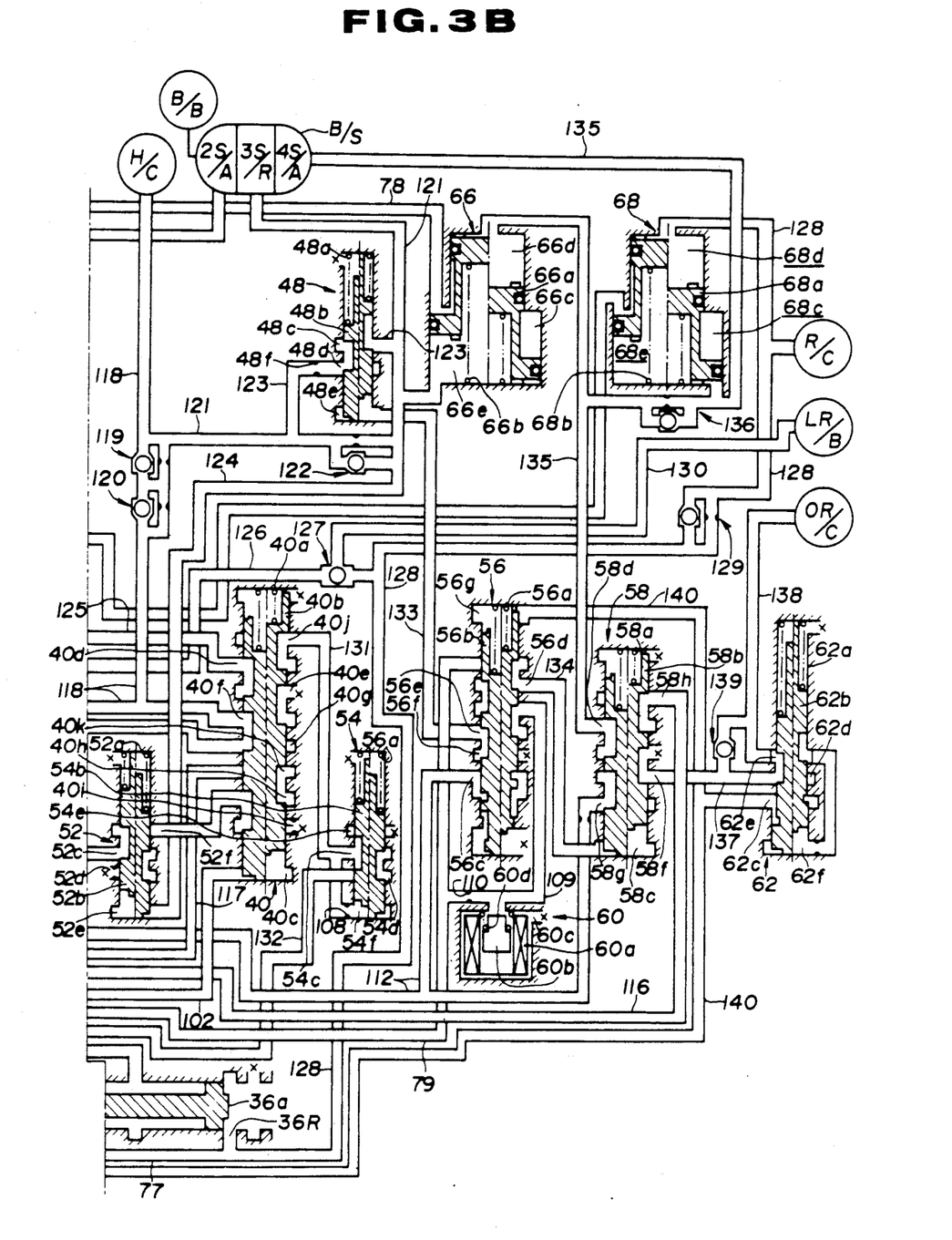

Four forward gear ratios and one reverse gear ratio are established when appropriate one or ones of the fluid operated frictional devices are activated by a line pressure generated in the hydraulic control system which is illustrated in FIGS. 3A and 3B. The following TABLE 1 illustrates which one or ones of the frictional devices are to be engaged to establish a desired one of the various gear ratios.

TABLE 1

|      | R/C | H/C | F/C | B/B | L & R/B |
|------|-----|-----|-----|-----|---------|
| Rev. | 0   |     |     |     | 0       |
| 1st. |     |     | 0   |     |         |
| 2nd. |     |     | 0   | 0   |         |
| 3rd. |     | 0   | 0   |     |         |
| 4th. |     | 0   |     | 0   |         |

In the TABLE 1, the character "0" represents engagement of the particular frictional device.

The forward one-way clutch F/0 C is free during forward rotation of the rear ring gear 14i with respect to the front pinion carrier 12c, but it is locked during the reverse rotation of the rear ring gear 14i. The low one-way clutch L/0 C is free during forward rotation of the front pinion carrier 12c, but it is locked during the reverse rotation of the front pinion carrier 12c.

The overrunning clutch 0 R/C is engaged to render the forward one-way clutch F/0 C inoperable, establishing engine brake running state.

FIGS. 3A and 3B illustrate the hydraulic control system.

The hydraulic control system comprises the following elements:

A pressure regulator valve 20;
A pressure modifier valve 22;
A line pressure solenoid 24;
A pilot valve 26;
A torque converter regulator valve 28;
A lock-up control valve 30;
A shuttle valve 32;
A lock-up solenoid valve 34;
A manual valve 36;
A first shift valve 38;
A second shift valve 40;
A first shift solenoid 42;
A second shift solenoid 44;
A forward clutch control valve 46;
A 3-2 timing valve 48;
A 4-2 relay valve 50;
A 4-2 sequence valve 52;
I range pressure reduction valve 54;
A shuttle valve 56;
An overrunning clutch control valve 58;
A third shift solenoid 60;
An overrunning clutch pressure reduction valve 62;
A second gear servo apply side pressure accumulator 64;
A third ratio servo release side pressure accumulator 66;
A fourth gear servo apply side pressure accumulator 68;
An accumulator control valve 70.

The above-mentioned elements are operatively connected, as illustrated in FIGS. 3A and 3B, to the reverse clutch R/C, high clutch H/C, forward clutch F/C, brake band B/B, low and reverse brake L&R/B, overrunning clutch 0 R/C, an apply side chamber 2A and a release side chamber 2B of the torque converter 2, and the oil pump 0/P.

The power train and hydraulic control system thus far described in connection with FIGS. 2, 3A and 3B are well known and described in a publication entitled "Service Manual For Automatic Transmission of The RE4R01A Type" (A261C07) published in Japan in March 1987 by Nissan Motor Company, Limited. In order to fully understood the operation of the automatic transmission, reference should be made to U.S. Pat. No. 4,680,992 issued to Hayasaki et al. on July 21, 1987, which has been herein incorporated by reference in its entirety (see shift solenoids 42, 44, and line pressure solenoid 24 in FIGS. 1A, 1B and 1C). Reference should also be made to U.S. Pat. No. 4,730,521 issued to Hayasaki et al. on Mar. 15, 1988, which has been herein incorporated by reference in its entirety.

Referring to FIG. 3B, the band brake B/B is activated by a band servo B/S. The band servo B/S comprises a second gear servo apply side pressure chamber 2S/A, a third gear servo release side pressure chamber 3S/R, and a fourth gear servo apply side pressure chamber 4S/A. When hydraulic fluid pressure is supplied to the second gear servo apply side pressure chamber 2S/A only, the band brake B/B is engaged. When, under this condition, the hydraulic fluid pressure is supplied to the third gear servo release side pressure chamber 3S/R, the band brake B/B is released. Subsequently, when the hydraulic fluid pressure is supplied to the fourth gear servo apply side pressure chamber 4S/A, the band brake B/B is engaged again.

Referring to FIGS. 3A and 3B, the first and second shift valves 38 and 40 are shiftable under the control of the first and second shift solenoids 42 and 44. When both of the first and second shift solenoids 42 and 44 are energized to take the "ON" position, a pilot pressure is supplied to the first and second shift valves 38 and 40, urging the spools of the first and second shift valves 38 and 40 to take upper positions as illustrated by the right-hand halves thereof, respectively. When both of the first and second shift solenoids 42 and 44 are deenergized to take the "OFF" position, the hydraulic fluid is discharged from the first and second shift valves 38 and 40, allowing the spools of the shift valves 38 and 40 to take lower positions as illustrated by the lefthand halves thereof, respectively.

The first and second shift solenois 42 and 44 are energized to take the "ON" position or deenergized to take the "OFF" position to establish four gear ratios in the automatic transmission in accordance with the schedule as illustrated in the following TABLE 2.

TABLE 2

|      | Sol. 42 | Sol. 44 |
|------|---------|---------|
| 1st. | ON      | OFF     |
| 2nd. | OFF     | ON      |
| 3rd. | OFF     | OFF     |
| 4th. | ON      | OFF     |

Figure 4:
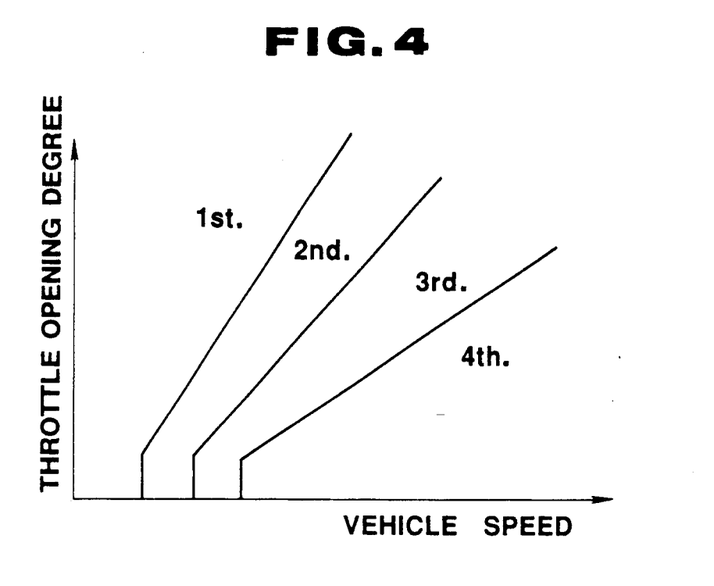
FIG. 4 is a gear shift point mapping.

The first and second shift solenoids 42 and 44, and thus the first and second shift valves 38 and 40 are controlled in accordance with a gear shift point mapping shown in FIG. 4. Turning back to FIG. 1, the control unit 10 includes a gear position signal generator 80 and a gear position control circuit 82. The throttle opening degree indicative signal from the throttle sensor 84 and the vehicle speed indicative signal from the vehicle speed sensor 86 are fed to the gear position signal generator 80. In the gear position signal generator 80, an appropriate gear position for the current throttle opening degree and vehicle speed is determined using the gear shift point mapping shown in FIG. 4. The output is supplied to the gear position control circuit 82 where an appropriate combination of ON and OFF to the gear position is determined in accordance with the schedule shown in TABLE 2 and generates output signals to set the shift solenoids 42 and 44 accordingly.

In the hydraulic control system shown in FIGS. 3A and 3B, pressurized hydraulic fluid discharged by the oil pump O/P is supplied to the pressure regulator valve 20 where pressure regulation is effected to generate a line pressure. This line pressure is supplied as a servo activating hydraulic pressure to selected one or ones of the above-mentioned frictional devices, i.e., clutches and brakes.

The pressure regulator valve 20 shown in FIG. 3A includes a spool 20b, a plug 20c, and a spring 20a between them. The pressurized hydraulic fluid discharged from the oil pump O/P is supplied to a port 20d to urge the spool 20b downward as viewed in FIG. 3A against the action of the spring 20a, while a modifier pressure is supplied via a modifier pressure fluid line 76 to the pressure regulator valve 20 to act on a lower end of the plug 20c as viewed in FIG. 3A. Due to the modifier pressure, the plug 20c moves toward the spool 20b to assist the action of the spring 20a. Thus, the magnitude of the line pressure (appearing at a port 20e) is a function of the force of the spring 20a. This force of the spring 20a is varied in response to the modifier pressure. Therefore, the line pressure is variable with the modifier pressure.

The modifier pressure is generated by the pressure modifier valve 22 that is controlled by a signal pressure generated under the control of the line pressure solenoid 24.

When it is deenergized, the line pressure solenoid 24 closes fluid communication between a signal pressure line 81 and a drain port 24c, while when it is energized, opens this fluid communication. The signal pressure line 81 is connected via an orifice 79 with a pilot pressure line 79. To vary the signal pressure within the signal pressure line 81, a ratio of a period of OFF time of the line pressure solenoid 24 to a period of ON time thereof is varied. This signal pressure is supplied to the pressure modifier valve 22 to act on an upper end (as viewed in FIG. 3A) of a spool 22b of the pressure modifier valve 22.

From the previous description, it is understood that the magnitude of the line pressure varies in response to the magnitude of the modifier pressure that varies in response to the magnitude of the signal pressure.

Referring back to the regulator valve 20 shown in FIG. 3A, an amount of hydraulic fluid flows out of a port 20h during movement of the spool 20b in effecting pressure regulation to induce the line pressure at the adjacent port 20e. The hydraulic fluid is supplied from the port 20h to the torque converter regulator valve 28 via a hydraulic fluid line 84. The hydraulic fluid under pressure generated by the torque converter regulator valve 28 is supplied via the lock-up control valve 30 to the torque converter 2. In this manner, the amount of hydraulic fluid appearing at the port 20h of the regulator valve 20 is used as a working medium within the torque converter 2.

The torque converter regulator valve 28 delivers the regulated hydraulic fluid pressure via a hydraulic fluid line 83 to the lock-up control valve 30. The lock-up control valve 30 includes a spool 30a moveable between a first position as illustrated by the righthand half thereof as viewed in FIG. 3A and a second position as illustrated by the lefthand half thereof as viewed in FIG. 3A. When the spool 30d of the lock-up control valve 30 assumes the first position as illustrated by the righthand half thereof as viewed in FIG. 3A, the hydraulic fluid in the hydraulic fluid line 83 is allowed to flow into a first torque converter fluid line 91, so that the hydraulic fluid is allowed to flow into the release side chamber 2B. The hydraulic fluid supplied to the release side chamber 2B flows into the apply side chamber 2A and also to the interior of the torque converter 2. The hydraulic fluid flows out of the interior of the torque converter 2 into a second torque converter fluid line 93. The hydraulic fluid in the second torque converter fluid line 93 flows past an orifice 86 into a hydraulic fluid line 88 leading to an oil cooler 39. Under this condition, a lock-up piston 2e is disengaged from a converter wall 2a and thus the torque converter 2 effects the torque multiplication. When the spool 30a of the lock-up control valve 30a of the lock-up control valve 30 assumes the second position as illustrated by the lefthand half thereof as viewed in FIG. 3A, the hydraulic fluid in the fluid line 83 under the regulated pressure appears in the second torque converter fluid line 93, while hydraulic fluid 91 is drained via a drain port 30c. Under this condition, hydraulic fluid flows into the fluid line 88 leading to the oil cooler 39 past the orifice 86, and since the release side chamber 2B is drained, the lock-up piston 2e is engaged with the converter wall 2a to render the torque converter 2 to lock up. As will now be understood, the first position of the spool 30a of the lock-up control valve 30 corresponds to the released state of the lock-up clutch, while the second position of the spool 30a corresponds to the engaged state of the lock-up clutch.

The movement of the spool 30a of the lock-up control valve 30 is responsive to pressure build-up in a hydraulic fluid chamber 30d with which a signal fluid pressure line 95 communicates. This signal fluid pressure line 95 is allowed to communicate with a solenoid fluid pressure line 97 when a spool 32b of the shuttle valve 32 assumes a position as illustrated by the upper half thereof as viewed in FIG. 3A, while when the spool 32b of the shuttle valve 32 assumes a spring set position as illustrated by the lower half thereof as viewed in FIG. 3A, the signal fluid pressure line 95 is allowed to communicate with a pilot pressure line 97 extending from the pilot valve 26. Since a so-called second hydraulic fluid pressure in a hydraulic fluid line 113, i.e., a hydraulic fluid pressure supplied to the second gear apply side chamber 2S/A, is supplied via a hydraulic fluid line 115 to a chamber 32c of the shuttle valve 32 to urge the spool 32b to the biased position as viewed in FIG. 3A during operation with the second or third or fourth gear position, the hydraulic fluid pressure in the solenoid pressure line 97 is supplied to chamber 30d via the hydraulic fluid line 95. During operation with the first gear ratio, however, the hydraulic fluid in the hydraulic fluid line 115 is discharged, allowing the spool 32b to assume the spring set position as illustrated by the lower half thereof as viewed in FIG. 3A. In this position of the spool 32b, the pilot pressure in the pilot pressure line 79 is supplied via the signal pressure line 95 to the chamber 30d, urging the spool 30d of the lock-up control valve 30 to the first position as illustrated by the righthand half thereof as viewed in FIG. 3A. Thus, the lock-up clutch is kept released during operation with the first gear ratio. However, during operation with the second or third or fourth gear ratio, the spool 30a of the lock-up control valve 30 is moveable in response to the solenoid pressure (in the fluid line 97) that is controlled by the lock-up solenoid 34 including a solenoid winding 34a and a valve element 34b biased by a spring 34d. The solenoid pressure line 97 has one end communicating with the pilot pressure line 79 via an orifice 98. The lock-up solenoid 34 is operatively coupled with a drain aperture opening to the solenoid pressure line 97 and normally closes the drain aperture when the solenoid 34 is deenergized or turned OFF. When the solenoid 34a is energized or turned ON, the valve element 34b is urged against the spring 34d to assume a position as illustrated in FIG. 3A, thus allowing hydraulic fluid to be discharged from the solenoid pressure line 97 past the drain aperture. Therefore, when the lock-up solenoid 34 is in the OFF position, the pilot pressure appears in the solenoid pressure line 97 and to the chamber 30a of the lock-up control valve 30, urging the spool 30d to assume the first position which corresponds to the released state of the lock-up clutch. When the lock-up solenoid 34 is in the ON position, the hydraulic pressure in the chamber 30d drops to allow the spool 30a to assume the second position thereof which corresponds to the engaged state of the lock-up clutch.

From the preceding description, it will now be understood that during operation with the second, third or fourth gear ratio, the lock-up clutch is engaged when the lock-up solenoid 34 is in the ON position and it is released when the lock-up solenoid 34 is in the OFF position. During operation with the first gear ratio, however, the lock-up clutch is kept released regardless of the position which the lock-up solenoid 34 assumes.

The lock-up solenoid 34 is turned ON and OFF within a cycle, and a ratio of a period of OFF time to a period of ON time is controlled by the control unit 10.

Turning back to FIG. 1, the control unit 10 includes a lock-up signal generator 88 and a lock-up control circuit 90. In the lock-up control circuit 90, the ratio of the period of OFF time of the lock-up solenoid 34 to the period of ON time thereof is decreased to a first relatively low predetermined value to allow a drop in hydraulic fluid pressure in the chamber 30d of the lock-up control valve 30 until the spool 30a assumes the second position as illustrated by the lefthand half thereof as viewed in FIG. 3A. When the lock-up signal disappears, the ratio of the period of OFF time to the period of ON time is increased to a second relatively high predetermined value to allow an increase in the hydraulic fluid pressure in the chamber 30d of the lock-up control valve 30 until the spool 30a assumes the first position as illustrated by the righthand half thereof as viewed in FIG. 3A.

The control unit also includes a comparator 94 where the temperature indicative signal from the fluid temperature sensor 92 is compared with a predetermined temperature value $T_O$ (for example 120° C.) and a comparator signal is generated when the temperature indicative signal is greater than the predetermined temperature value. This signal is supplied to the lock-up signal generator 88. Also supplied to this generator 88 are the throttle opening degree indicative signal from the throttle sensor 84 and the vehicle speed indicative signal from the vehicle speed sensor 86.

Figure 5:
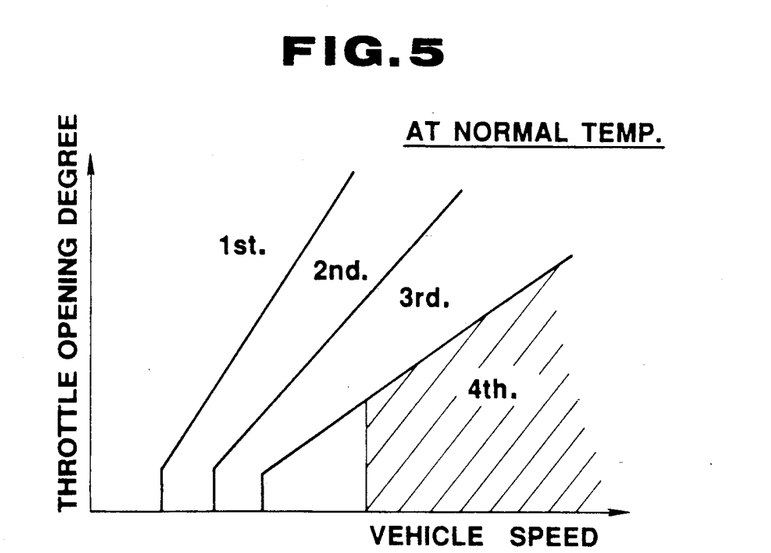
FIG. 5 is a first lock-up shift point mapping superimposed on the gear shift point mapping shown in FIG. 4, illustrating a lock-up range by a shadowed area.

The lock-up signal generator 88 functions as follows: When no comparator signal is generated, that is, when the fluid temperature is not higher than the predetermined temperature value $T_O$ (=120° C.), lock-up shift point mapping as illustrated in FIG. 5 is set and a table look-up operation of this lock-up shift point mapping is performed using the given throttle opening degree indicative signal and the vehicle speed indicative signal to determine whether the lock-up signal is to be generated or not. When the comparator signal is generated, that is, when the fluid temperature is higher than the predetermined temperature value $T_O$ (=120° C.), a lock-up shift point mapping as illustrated in FIG. 6 is set and a table look-up operation of this lock-up shift point mapping is performed using the given throttle opening degree indicative signal and the vehicle speed indicative signal to determine whether the lock-up signal is to be generated or not.

Figure 6:
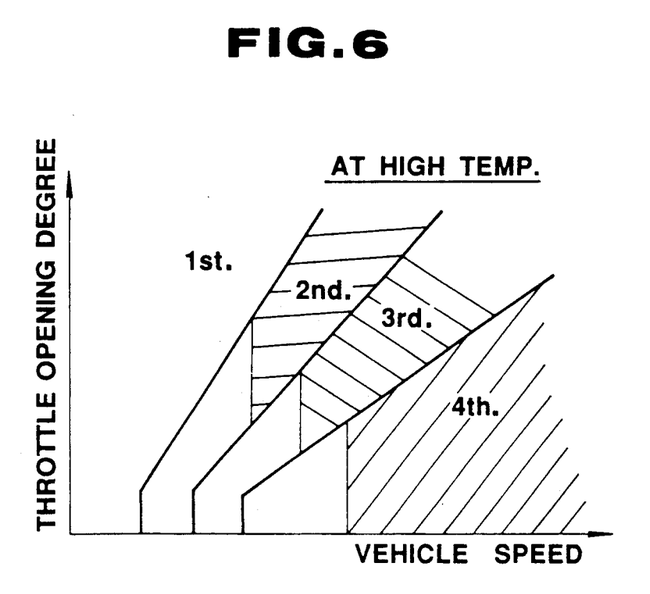
FIG. 6 is a second lock-up shift point mapping superimposed on the gear shift point mapping shown in FIG. 4, illustrating three lock-up ranges for fourth, third, and second gear positions by shadowed areas, respectively.

In FIGS. 5 and 6, the lock-up ranges are illustrated by shadowed areas. From the comparison of FIG. 5 with FIG. 6, it will be recognized that the lock-up range stretches over the third and second gear positions when the fluid temperature becomes higher than the predetermined temperature value $T_O$.

Figure 7:
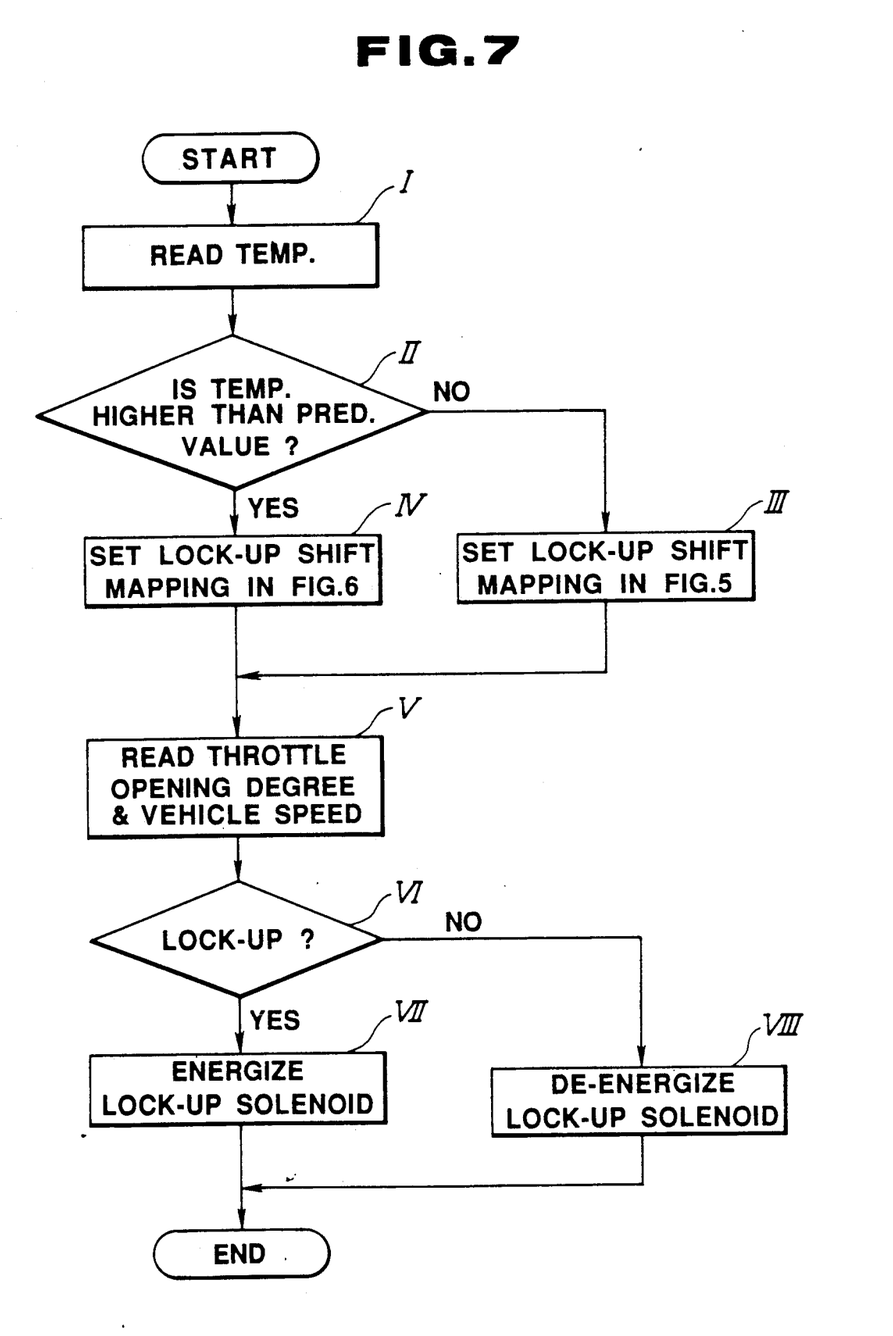
FIG. 7 is a flow chart of a program for a lock-up control.

Referring to the flow chart shown in FIG. 7, it is described in detail how the control unit 10 performs the lock-up control.

In FIG. 7, at a step I, a reading operation is performed using the temperature indicative signal from the temperature sensor 92 to store the result as a fluid temperature T. At the subsequent step II, the fluid temperature T stored is compared with the predetermined temperature value $T_O$ (=120° C., in this embodiment) that is set lower than an allowable upper limit temperature value $T_L$ (see FIG. 8). When an answer to the inquiry at the step II is NO, the program proceeds to a step III where the lock-up shift point mapping shown in FIG. 5 is set for the subsequent table look-up operation. When an answer to the inquiry at the step II is YES, the program proceeds to a step IV where the lock-up shift point mapping shown in FIG. 6 is set for the subsequent table look-up operation. At the subsequent step V, a reading operation is performed based on the throttle opening degree indicative signal from the throttle sensor 84 to store the result as a throttle opening degree TH and then another reading operation is performed based on the vehicle speed indicative signal to store the result as a vehicle speed V. Then, the program proceeds to a step VI where a table look-up operation of the lock-up shift point mapping which has been set at the step III or IV is performed using the stored throttle opening degree TH and vehicle speed V to determine whether the torque converter should lock up or not. When it is determined at the step VI that the lock-up clutch is to be engaged, that is, when an answer to the inquiry at the step VI is YES, the program proceeds to a step VII where the ratio of the period of OFF time of the lock-up solenoid 34 to the period of ON time thereof is decreased, thus keeping the lock-up solenoid 34 in substantially fully energized state. When it is determined at the step VI that the lock-up clutch is to be released, that is, when an answer to the inquiry at the step VI is NO, the program proceeds to a step VIII where the above mentioned ratio is increased, thus leaving the lock-up solenoid 34 in substantially de-energized state.

Figure 8:
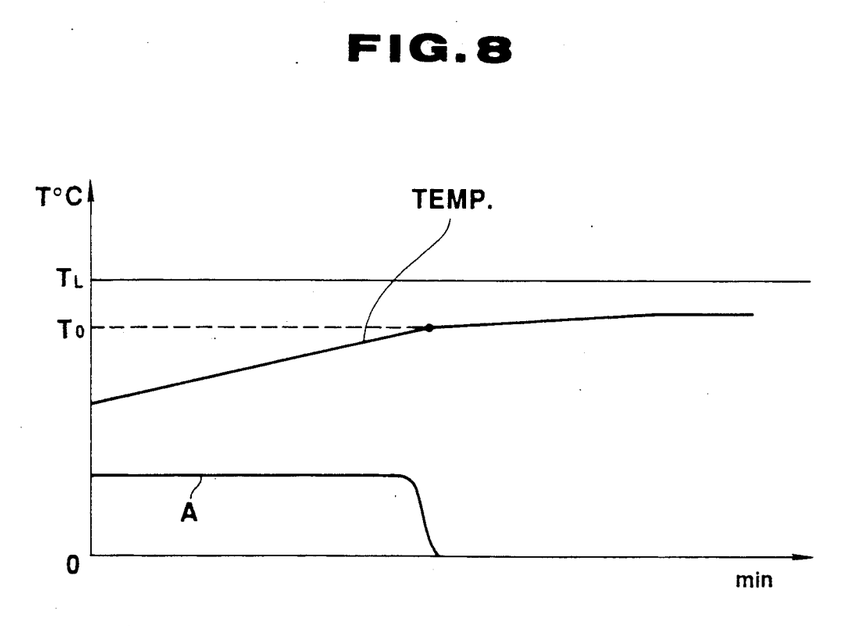
FIG. 8 is a time chart illustrating the relationship between a temperature of hydraulic fluid and a slip within a torque converter.

FIG. 8 shows a characteristic curve A plotting an amount of slip taking place in the torque converter 2 and a characteristic curve TEMP. plotting a fluid temperature. As will be readily understood from FIG. 8, when the fluid temperature becomes higher than the predetermined temperature value $T_O$, the lock-up clutch is engaged to render the torque converter 2 to lock up. Thus, the amount of slip drops to zero immediately after the fluid temperature becomes higher than the predetermined temperature value $T_O$. Since the torque converter 2 stops stirring the hydraulic fluid therein, further increase in the fluid temperature becomes slow and subsequently zero. Thus, the fluid temperature is prevented from exceeding the allowable upper limit value $T_L$ since the predetermined temperature value $T_O$ is set slightly lower than the allowable upper limit value $T_L$.

Since, as illustrated in FIG. 6, the lock-up ranges are set for the third and second gear positions, respectively, excessive rise in fluid temperature which tends to occur during operation with the third or second gear position with the lock-up clutch released is effectively prevented.

What is claimed is:

1. In a motor vehicle having an engine, a torque converter with a fluid operated lock-up clutch, and an automatic transmission including a plurality of fluid operated frictional devices, the automatic transmission being drivingly connected via the torque converter to the engine, the automatic transmission being shiftable among a plurality of gear positions including a predetermined gear position, a lock-up control comprising:

means for detecting a fluid temperature of hydraulic fluid which is used in the torque converter and the automatic transmission and generating a fluid temperature indicative signal indicative of said fluid temperature detected;

means responsive to said fluid temperature indicative signal for setting a lock-up range at the predetermined gear position when said fluid temperature indicative signal fails to be greater than a predetermined temperature value, and setting said lock-up range to stretch beyond said predetermined gear position to include at least another one of the plurality of gear positions such that said lock-up range covers both said predetermined gear position and said another of the plurality of gear positions when said fluid temperature indicative signal is greater than said predetermined temperature value;

means for detecting predetermined operating variables of the motor vehicle and generating signals indicative of said predetermined operating variables detected;

means for generating a lock-up signal when said signals indicative of said predetermined operating variables indicate that the motor vehicle operates in said lock-up range; and means for engaging the lock-up clutch in response to the presence of said lock-up signal.

2. In a motor vehicle having an engine with a throttle which opens in degrees, a torque converter with a fluid operated lock-up clutch, and an automatic transmission including a plurality of fluid operated frictional devices, the automatic transmission being drivingly connected via the torque converter to the engine, the automatic transmission being shiftable among a plurality of gear positions including a predetermined gear position, a lock-up control comprising:

means for detecting a fluid temperature of hydraulic fluid which is used in the torque converter and the automatic transmission and generating a fluid temperature indicative signal indicative of said fluid temperature detected;

means for detecting a throttle opening degree of the throttle and generating a throttle opening degree indicative signal indicative of said throttle opening degree detected;

means for detecting a vehicle speed of the motor vehicle and generating a vehicle speed indicative signal indicative of said vehicle speed detected;

means responsive to said fluid temperature indicative signal for setting a lock-up range at the predetermined gear position when said fluid temperature indicative signal fails to be greater than a predetermined temperature value, and setting said lock-up range to stretch beyond said predetermined gear position to include at least another one of the plurality of gear positions such that said lock-up range covers both said predetermined gear position and said another of the plurality of gear positions when said fluid temperature indicative signal is greater than said predetermined temperature value;

means for generating a lock-up signal when said throttle opening degree indicative signal and said vehicle speed indicative signal indicate that the motor vehicle operates in said lock-up range; and means for engaging the lock-up clutch in response to the presence of said lock-up signal.

3. In a motor vehicle having an engine with a throttle which opens in degrees, a torque converter with a fluid operated lock-up clutch, and an automatic transmission including a plurality of fluid operated frictional devices, the automatic transmission being drivingly connected via the torque converter to the engine, the automatic transmission being shiftable among a plurality of gear positions including a predetermined gear position, a lock-up control comprising:

means for detecting a fluid temperature of hydraulic fluid which is used in the torque converter and the automatic transmission and generating a fluid temperature indicative signal indicative of said fluid temperature detected;

means for detecting a throttle opening degree of the throttle and generating a throttle opening degree indicative signal indicative of said throttle opening degree detected;

means for detecting a vehicle speed of the motor vehicle and generating a vehicle speed indicative signal indicative of said vehicle speed detected;

means for storing a first predetermined lock-up shift point mapping that defines a lock-up range for the predetermined gear position as a function of said throttle opening degree and said vehicle speed;

means for storing a second predetermined lock-up shift point mapping that defines a lock-up range for the predetermined gear position and at least another one of the plurality of gear positions as a function of said throttle opening degree and said vehicle speed;

means responsive to said fluid temperature indicative signal for setting said first predetermined lock-up shift point mapping when said fluid temperature indicative signal fails to be greater than a predetermined temperature value and said second lock-up shift point mapping when said fluid temperature indicative signal is greater than said predetermined temperature value; and means for engaging the lock-up clutch in accordance with that one of said first and second lock-up shift point mappings which has been set.

4. A method of a lock-up control in a motor vehicle having an engine, a torque converter with a fluid operated lock-up clutch, and an automatic transmission including a plurality of fluid operated frictional devices, the automatic transmission being drivingly connected via the torque converter to the engine, the automatic transmission being shiftable among a plurality of gear positions including a predetermined gear position, the method comprising the steps of:

detecting a fluid temperature of hydraulic fluid which is used in the torque converter and the automatic transmission and generating a fluid temperature indicative signal indicative of said fluid temperature detected;

detecting predetermined operating variables of the motor vehicle and signals indicative of said predetermined operating variables detected;

setting a lock-up range at the predetermined gear position when said fluid temperature indicative signal fails to be greater than a predetermined value;

extending said lock-up range to include both said predetermined gear position and at least another one of a plurality of gear positions other than the predetermined gear position, when said fluid temperature signal is greater than said predetermined value;

generating a lock-up signal when said signals indicative of said predetermined operating variables indicate that the motor vehicle operates in said lock-up range; and engaging the lock-up clutch in response to presence of said lock-up signal.

5. A method of a lock-up control in a motor vehicle having an engine with a throttle which opens in degrees, a torque converter with a fluid operated lock-up clutch, and an automatic transmission including a plurality of fluid operated frictional devices, the automatic transmission being drivingly connected via the torque converter to the engine, the automatic transmission being shiftable among a plurality of gear positions including a predetermined gear position, the method comprising the steps of:

detecting a fluid temperature of hydraulic fluid which is used in the torque converter and the automatic transmission and generating a fluid temperature indicative signal indicative of said fluid temperature detected;

detecting a throttle opening degree of the throttle and generating a throttle opening degree indicative signal indicative of said throttle opening degree detected;

detecting a vehicle speed of the motor vehicle and generating a vehicle speed indicative signal indicative of said vehicle speed detected;

storing a first predetermined lock-up shift point mapping that defines a lock-up range for the predetermined gear position as a function of said throttle opening degree and said vehicle speed;

storing a second predetermined lock-up shift point mapping that defines a lock-up range for the predetermined gear position and at least another one of the plurality of gear positions other than the predetermined gear position as a function of said throttle opening degree and said vehicle speed;

setting, responsive to said fluid temperature indicative signal, said first predetermined lock-up shift point mapping when said fluid temperature indicative signal fails to be greater than a predetermined temperature value and said second lock-up shift point mapping when said fluid temeprature indicative signal is greater than said predetermined temperature value; and engaging the lock-up clutch in accordance with that one of said first and second lock-up shift point mappings which has been set.

6. In a motor vehicle having an engine with a throttle which opens in degrees, a torque converter with a fluid operated lock-up clutch and an automatic transmission including a plurality of fluid operated frictional devices, the automatic transmission being drivingly connected via the torque converter to the engine, the automatic transmission being shiftable among a plurality of gear positions including a predetermined gear position, a lock-up control comprising:

means for detecting a fluid temperature of hydraulic fluid which is used in the torque converter and the automatic transmission and generating a fluid temperature indicative signal indicative of said fluid temperature detected;

means for detecting a throttle opening degree of said throttle and generating a throttle opening degree indicative signal indicative of said throttle opening degree detected;

means for detecting a vehicle speed of the motor vehicle and generating a vehicle speed indicative signal indicative of said vehicle speed detected;

means for storing a first lock-up shift point mapping that defines a lock-up range for a predetermined gear position as a function of said throttle opening degree and said vehicle speed;

means for storing a second lock-up shift point mapping that defines a lock-up range including said predetermined gear position and extending beyond said predetermined gear position to include at least another of said plurality of gear positions as a function of said throttle opening degree and said vehicle speed;

means responsive to said fluid temperature indicative signal for setting said first lock-up shift point mapping when said fluid temperature indicative signal fails to be greater than a predetermined temperature value and said second lock-up shift point mapping when said fluid temperature indicative signal is greater than said temperature value; and means for engaging the lock-up clutch in response to which of said first and second lock-up shift point mappings have been set.

* * * * *